United States Patent
Ingold et al.

(10) Patent No.: US 6,831,110 B2
(45) Date of Patent: Dec. 14, 2004

(54) RIGID, DIMENSIONALLY STABLE POLYURETHANE FOAMS AND A PROCESS FOR THE PRODUCTION OF SUCH FOAMS IN WHICH THE FOAM PRESSURE IS REDUCED

(75) Inventors: Kerry A. Ingold, Pittsburgh, PA (US); Raymond A. Yourd, Pittsburgh, PA (US)

(73) Assignee: Bayer Polymers LLC, Pittsburgh, PA (US)

( * ) Notice: Subject to any disclaimer, the term of this patent is extended or adjusted under 35 U.S.C. 154(b) by 0 days.

(21) Appl. No.: 10/404,572

(22) Filed: Apr. 1, 2003

(65) Prior Publication Data

US 2004/0198856 A1 Oct. 7, 2004

(51) Int. Cl.[7] .............................................. C08G 18/28
(52) U.S. Cl. ...................... 521/128; 521/129; 521/130; 521/167; 521/170; 521/174
(58) Field of Search ................................ 521/128, 129, 521/130, 167, 170, 174

(56) References Cited

U.S. PATENT DOCUMENTS

| | | | |
|---|---|---|---|
| 5,057,480 A | 10/1991 | Petrella | 502/167 |
| 6,046,247 A * | 4/2000 | Gluck et al. | 521/99 |
| 6,380,274 B1 | 4/2002 | Chen et al. | 521/115 |
| 6,384,097 B1 | 5/2002 | Tokumoto et al. | 521/155 |
| 6,387,972 B1 | 5/2002 | Ghobary et al. | 521/115 |
| 6,432,864 B1 | 8/2002 | Wendel et al. | 502/162 |

OTHER PUBLICATIONS

Polyurethanes World Congress, Oct. 10–13, 1993, M.L. Listemann et al, pp. 595–607, "The Influence of Tertiary Amine Structure on Blow–to–Gel Selectivity".

Polyurethanes World Congress, Sep. 24–26, 1991, M.L. Listemann et al, pp. 524–544, "Amine Catalyst Characterization by a Foam Model Reaction".

* cited by examiner

Primary Examiner—John M. Cooney, Jr.
(74) Attorney, Agent, or Firm—Joseph C. Gil; Lyndanne M. Whalen

(57) ABSTRACT

Rigid foams are made by reacting a polyisocyanate with an isocyanate-reactive composition which includes at least one isocyanate-reactive compound, preferably, an amine-initiated polyol and more preferably, an amine-initiated polyether polyol and a second, different polyol in the presence of a blowing agent composition which includes water and a catalyst composition which includes two different blowing catalysts, preferably, pentamethyldiethylenetriamine and bis(2-dimethylamino-ethyl)ether.

14 Claims, No Drawings

RIGID, DIMENSIONALLY STABLE POLYURETHANE FOAMS AND A PROCESS FOR THE PRODUCTION OF SUCH FOAMS IN WHICH THE FOAM PRESSURE IS REDUCED

BACKGROUND OF THE INVENTION

The present invention relates to a process for producing rigid, dimensionally stable, polyurethane foams in which the amount of pressure generated during the foaming process is reduced and to the foams produced by this process.

Rigid polyurethane foams and processes for their production are known. Such foams are typically produced by reacting an isocyanate with an isocyanate-reactive component such as a polyol in the presence of a surfactant, water, blowing agent and a catalyst.

The processing and properties of the foam may be affected by the specific isocyanate, isocyanate-reactive component, blowing agent, catalyst and/or additives used. The catalyst is known to affect the rate of blowing gas generation and gelation.

U.S. Pat. No. 6,432,864, for example, teaches that if a catalyst promotes the isocyanate-water (blowing) reaction to too high a degree, carbon dioxide will be evolved before sufficient reaction of isocyanate with polyol (gelling) has occurred and the resultant foam will collapse. If, however, the catalyst promotes the gelling reaction too strongly, a substantial amount of carbon dioxide will be generated after a substantial degree of the polymerization has already occurred thereby producing a foam with broken or poorly defined cells. The balance sought between promotion of the blowing action and of the gelling action is achieved in this disclosure by using an acid-blocked amine catalyst corresponding to a specified structure.

In U.S. Pat. No. 6,384,097, the blowing reaction was delayed while the gelling reaction was promoted in order to produce a foam having less odor which was highly curable and fire retardant by use of a quaternary ammonium compound corresponding to a specified formula.

In U.S. Pat. No. 6,387,972, delayed catalytic reaction is taught to be achieved without adversely affecting the balance between blowing and gelation by using a catalyst composition that includes a specific reactive tertiary amine compound and a hydroxy-carboxylic acid salt or halocarboxylic acid salt of the specific reactive tertiary amine compound. The specific reactive tertiary amine compound must be selected from bis(dimethylaminopropyl)amino-2-propanol, bis(dimethylaminopropyl)amine, dimethylaminopropyldipropanolamine, bis(dimethylamino)-2-propanol, N,N,N'-trimethyl-N'-hydroxyethyl-bis(aminoethyl)ether and mixtures thereof.

In U.S. Pat. No. 6,380,274, the disclosed catalyst composition (an amide represented by a specified structure) is taught to be desirable because it has high activity, good blowing or gelling selectivity and it is bound to the urethane during the reaction so that it is not released from the final product.

In U.S. Pat. No. 5,507,480, molded polyurethane foams useful in seating applications are produced using a catalyst composition consisting essentially of 25–80 wt % pentamethyldiethylenetriamine (PMDETA) and 20–75 wt % bis(dimethylaminopropyl)methylamine. The advantages attributed to this catalyst composition include production of more open cells in the foam and the need for less gelling catalyst.

It is clear from these teachings in the prior art that selection of the optimum catalyst composition for a polyurethane-forming reaction mixture is dependent upon the particular use to which the foam product will be put and the foam characteristics necessary for that particular use.

The expression "non-molded" as used herein refers to end-use products such as water heaters in which pour-in-place polyurethane or polyisocyanurate foam is used as an insulation medium. These end-use products are foamed without the use of structural support, such as fixturing, molds or other forms of containment to prevent damage or dimensional irregularities resulting from the expansion of the reaction mixture within the cavity(ies) of the end-use product.

Many of the catalyst compositions currently used in the production of non-molded products with rigid foams generate a significant amount of pressure after the foaming reaction is complete. A contributing cause to this pressure is the ongoing generation and expansion of blowing gases after the gel point is reached. Furthermore, foam flow can be restricted when gelling occurs before gas generation/expansion is complete. This restriction in foam flow make it difficult to produce a foam having a uniform cell structure with a minimal amount of overfilling (referred to as "packing") and can damage the non-molded end-use product in which the foaming takes place.

Many of the commonly disclosed catalyst packages used in the production of rigid polyurethane polyisocyanurate foams are a combination of a blowing catalyst (i.e., a catalyst which promotes the reaction of a blowing agent such as water with the isocyanate to generate a gas such as carbon dioxide) and a gel catalyst (i.e., a catalyst which promotes the polymer-forming reaction of polyol with isocyanate). PMDETA is one of the most commonly used blowing catalysts. N,N-dimethylcyclohexylamine (DMCHA) is one of the most commonly used gel catalysts. Foams produced with a minimal level of packing made using a blowing/gelling catalyst composition such as PMDETA and DMCHA, however, are not as dimensionally stable as is desired for non-molded foam applications such as water heater insulation. Nor are the cell structure of the foams made with this catalyst combination uniform.

It would therefore be commercially advantageous to have a catalyst composition which makes it possible to produce a rigid polyurethane foam having a uniform cell structure without generating a great deal of pressure or adversely affecting the flow characteristics of the foam-forming mixture, while utilizing a minimal level of packing, particularly in the production of non-molded foams for use in end-use applications such as water heaters.

SUMMARY OF THE INVENTION

It is an object of the present invention to provide a process for the production of rigid foams in which the pressure generated during and after the foaming process is sufficiently reduced that the product foam will have a relatively uniform cell structure and the end-use product in which the foam is formed is not damaged due to excess pressure within the foam.

It is a further object of the present invention to provide a process for the production of dimensionally stable, rigid polyurethane foams in which the reaction of isocyanate with the polyol(s) is not so fast that the foam-forming mixture begins to set before the cavity of the non-molded part has been completely filled with the foam-forming mixture.

It is also an object of the present invention to provide a catalyst composition for use in the production of dimensionally stable rigid polyurethane foams.

These and other objects which will be apparent to those skilled in the art are accomplished by reacting an organic isocyanate with an isocyanate-reactive component in the presence of a blowing agent composition and a catalyst composition. The catalyst composition must include at least two blowing catalysts. Catalyst compositions in which both bis(2-dimethylaminoethyl)ether (BDMAEE) and pentamethyldiethylenetriamine (PMDETA) are present are particularly preferred. Use of an isocyanate-reactive component which includes an amine-initiated polyol and water is particularly advantageous.

DETAILED DESCRIPTION OF THE PRESENT INVENTION

It has surprisingly been found that use of a catalyst composition which includes at least two blowing catalysts such as BDMAEE and PMDETA makes it possible to achieve the desired blowing and gelling reaction rates and the cure times required in non-molded commercial foam production processes. The effectiveness of this catalyst composition is most evident in foam-forming systems in which at least one amine-initiated polyol and water are present.

The present invention is directed to a catalyst composition, to a rigid dimensionally stable polyurethane foam having a uniform cell structure, to a process for the production of such foams and to non-molded end-use products such as water heaters insulated with such foams.

The catalyst composition of the present invention must include at least two blowing catalysts. As used herein, a "blowing catalyst" is a catalyst having a blow to gel selectivity greater than 1. The gel selectivity is determined in accordance with the model disclosed and discussed in Listemann et al, "The Influence of Tertiary Amine Structure on Blow-to-Gel Selectivity", *Polyurethanes World Congress*. Oct. 10–13, 1993, at pages 595–607; and Listemann et al, "Amine Catalyst Characterization by a Foam Model Reaction", *Polyurethanes World Congress*, Sep. 24–26, 1991, at pages 524–544.

Examples of suitable blowing catalysts include: N,N,N', N", N"-pentamethyldiethylenetriamine (PMDETA), and bis-dimethylaminoethyl ether (BDMAEE).

The catalyst composition of the present invention may also optionally include other catalysts known to be useful in the production of polyurethanes. The catalyst composition of the present invention is generally included in the isocyanate-reactive component (i.e., polyol, any polyamine, blowing agent, additives, etc.) of the foam-forming reaction mixture but it may also be added directly to the foam-forming mixture or, less preferably, to the isocyanate component. The two blowing catalysts required in the present invention may be combined before being introduced to the isocyanate-reactive component or foam-forming mixture or they may be introduced into the isocyanate-reactive component or foam-forming mixture separately.

Each of the required blowing catalysts is generally used in an amount of from about 0.01 to about 1.0 parts by weight, based on total weight of isocyanate-reactive component, preferably, from about 0.02 to about 0.5 parts by weight, most preferably, from about 0.2 to about 0.5 parts by weight. Each of the two required blowing catalysts of the catalyst composition of the present invention may be used in the same relative amounts but this is not necessary. It is preferred that the blowing catalysts be used in equivalent amounts but they may be combined in any ratio in amounts within the above-specified ranges.

Other catalysts known to be useful in polyurethane-forming reactions may optionally be included in the catalyst composition of the present invention in minor amounts (i.e., in an amount less than 0.5, based on total isocyanate-reactive component). Such optional catalysts include the known tertiary amine compounds and organometallic compounds. Examples of suitable tertiary amine catalysts include: triethylene diamine, N-methylmorpholine, dimethylcyclohexylamine, tetramethylene diamine, 1-methyl-4-dimethylaminoethyl-piperazine, 3-methoxy-N-dimethyl-propylamine, N-ethylmorpholine, diethylethanol amine, N-cocomorpholine, N,N-dimethyl-N,N'-dimethylisopropyl-propylene diamine, N,N-diethyl-3-diethyl aminopropyl amine and dimethyl-benzyl amine. Examples of suitable organometallic catalysts include organomercury, organolead, organoferric and organotin catalysts, with organotin catalysts being preferred. Suitable organotin catalysts include tin salts of carboxylic acids such as dibutyltin di-2-ethyl hexanoate and dibutyltin dilaurate. Metal salts such as stannous chloride can also function as catalysts for the urethane reaction. A catalyst for the trimerization of polyisocyanates, such as an alkali metal alkoxide or carboxylate, may also optionally be used.

The blowing agent composition of the present invention includes water and may include any of the known blowing agents useful in the production of polyurethane foams such as hydrocarbons, hydrochlorofluorocarbons ("HCFC's"), hydrofluorocarbons ("HFC's) and any combination thereof.

Water must be included in the foam-forming mixture catalyzed in accordance with the present invention. Water is generally included in the foam-forming mixture of the present invention in the isocyanate-reactive component in an amount of at least 1.0 wt. %, preferably from about 1.0% to about 7% by weight, based on the total weight of isocyanate-reactive components. Water may, of course, be included in greater or smaller amounts but the benefits achieved with the catalyst composition of the present invention are not as pronounced. The water may be added directly to the foam-forming mixture or it may be present in one or more components of the isocyanate-reactive composition.

Other optional blowing agents useful in the present invention include hydrocarbons and hydrocarbon blends, hydrofluorocarbons (HFCs), hydrochlorofluorocarbons (HCFCs) and combinations thereof. Specific examples of suitable blowing agents are: 1,1-dichloro-1-fluoroethane (HCFC 141b), 1,1,1,2-tetrafluoro-ethane (HFC 134a), chlorodifluoromethane (HCFC 22), 1-chloro-1,1-difluoroethane (HCFC 142b), 1-chloro-1,2,2,2-tetrafluoroethane (HCFC 124), 1,1,2,2-tetrafluoroethane (HFC 134), 1,1,1,3,3-pentafluoropropane (HFC 245fa), 1,1,1,3,3-pentafluorobutane (HFC 365mfc), 1,1,1,4,4,4-hexafluorobutane (HFC 356mffm), cyclopentane, isopentane, cyclo-hexane, isobutane and combinations of any of these blowing agents at any ratio. Hydrocarbons and HFC's are the most preferred of these optional blowing agents because they have a zero ozone depletion potential. Each of these blowing agents is known to those skilled in the art and is commercially available.

As is known in the art, rigid foams are prepared by reacting polyisocyanates with isocyanate-reactive compounds. Any of the known organic polyisocyanates may be used in the present invention. Suitable polyisocyanates include: aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4- diisocyanate, cyclohexane, 1,4-diisocyanate, isomers of hexa-hydrotoluene diisocyanate, naphthylene-1,5-diisocyanate, 1-methylphenyl-2,4-phenyl diisocyanate, diphenyl-methane-4,4'-diisocyanate, diphenylmethane-2,4'-diisocyanate, 4,4'-biphenylene diisocyanate, 3,3'-methoxy-4,4'-biphenylene diisocyanate and 3,3'-dimethyldiphenylpropane-4,4'-diisocyanate; triisocyanates such as toluene-2,4,6-triisocyanate and polyisocyanates such as 4,4'-dimethyldiphenylmethane-2,2',5,5'-tetraisocyanate and the diverse polymethylene polyphenyl polyisocyanates.

A crude polyisocyanate may also be used in making polyurethanes, such as the crude toluene diisocyanate obtained by the phosgenation of a mixture of toluene diamines or the crude diphenylmethane diisocyanate obtained by the phosgenation of crude diphenylmethane diamine.

Especially preferred for making rigid polyurethanes are methylene-bridged polyphenyl polyisocyanates and pre-polymers of methylene-bridged polyphenyl polyisocyanates, having an average functionality of from about 2.0 to about 3.5, preferably from about 2.2 to about 3.0, most preferably from about 2.5 to 2.8 isocyanate moieties per molecule and an NCO group content of from about 27 to about 34% by weight, preferably from about 28 to about 32% by weight.

The isocyanate index (ratio of equivalents of isocyanates to equivalents of active hydrogen-containing groups) is advantageously from about 3.0 to about 1.0, preferably about 2.0 to about 1.0 and most preferably from about 1.5 to about 1.0.

The isocyanate-reactive composition used to produce polyurethane foams in accordance with the present invention must include at least one isocyanate-reactive compound such as a polyol or polyamine. The isocyanate-reactive composition preferably includes an amine-initiated polyol and most preferably an amine-initiated polyol and at least one other polyhydroxyl compound. The amine-initiated polyol may be any of the known amine-initiated polyether polyols. The hydroxyl number of the amine-initiated polyols will generally be at least 60, preferably at least 250, most preferably at least 350 mg KOH/g. The hydroxyl numbers given herein are determined in accordance with ASTM D-2849-69, Method C.

Examples of suitable amines that may be used to prepare the amine-initiated polyether polyols include: 2,4'-, 2,2'-, and 4,4'-methylene dianiline; 2,6- or 2,4-toluene diamine and vicinal toluene diamines; p20 aminoaniline; 1,5-diaminonaphthalene; mixtures of methylene dianiline and its higher homologs; ethylene diamine, propylene diamine; diethylene triamine; 1,3-diaminopropane; 1,3-diaminobutane; and 1,4-diaminobutane. Ethylene diamine and toluene diamines are particularly preferred.

The amine-initiated polyols may be produced by any of the known methods. Generally, such polyols are produced by alkoxylating the amine initiator, either with or without an alkaline catalyst, until the desired hydroxyl number has been attained.

Suitable alkoxylating agents include any of the known alkylene oxides such as ethylene oxide, propylene oxide, butylene oxide, amylene oxide, and mixtures thereof. Ethylene oxide and propylene oxide are preferred.

Any of the other known isocyanate reactive organic compounds may be included in the isocyanate-reactive composition used to produce foams in accordance with the present invention. Polyols or mixtures of polyols having an average of at least 2, preferably from about 3 to about 7, most preferably from about 3.5 to about 6.0 isocyanate-reactive hydrogen atoms and having a hydroxyl (OH) number of from about 35 to about 1000 (preferably from about 150 to about 770) are particularly preferred isocyanate-reactive compounds useful in the practice of the present invention. The molecular weight of such isocyanate-reactive materials is determined from the functionality and equivalent weight determined by the end group analysis method generally used by those skilled in the art and represents a number average molecular weight.

Polyols with suitable functionality and molecular weight may be prepared by reacting a suitable initiator containing active hydrogens with alkylene oxide. Suitable initiators are those having at least 2 active hydrogen atoms or mixtures of initiators where the mole average of active hydrogens is at least 2, preferably from about 3 to about 7, and more preferably from about 3.5 to about 6. Active hydrogen atoms are defined as those hydrogen atoms which are observed in the well-known Zerewitinoff test, see Kohler, Journal of the American Chemical Society, p. 3181, Vol. 49 (1927). Representatives of such active hydrogen-containing groups include —OH, —COOH, —SH and —NH.

Examples of suitable initiators include pentaerythritol, carbohydrate compounds such as lactose, α-methylglucoside, α-hydroxyethylglucoside, hexitol, heptitol, sorbitol, dextrose, mannitol, sucrose and the like. Other suitable initiators which may be used include water, glycols, glycerine, trimethylolpropane, hexane triol, aminoethyl piperazine and the like.

The polyols may be prepared by methods well-known in the art such as taught by Wurtz, *The Encyclopaedia of Chemical Technology*, Vol. 7, p. 257–266, Interscience Publishers Inc. (1951) and U.S. Pat. No. 1,922,459. For example, polyols can be prepared by reacting, in the presence of an oxyalkylation catalyst, the initiator with an alkylene oxide. Suitable oxyalkylation catalysts are known to those skilled in the art.

The alkylene oxides which may be used in the preparation of the polyol include any epoxide or α,β-oxirane, and are unsubstituted or alternatively substituted with inert groups which do not chemically react under the conditions encountered during preparation of a polyol. Examples of suitable alkylene oxides include ethylene oxide, propylene oxide, 1,2- or 2,3-butylene oxide, the various isomers of hexane oxide, styrene oxide, epichlorohydrin, epoxychlorohexane, epoxychloropentane and the like. Most preferred, on the basis of performance, availability and cost are ethylene oxide, propylene oxide, butylene oxide and mixtures thereof, with ethylene oxide, propylene oxide, or mixtures thereof being most preferred. When polyols are prepared with combinations of alkylene oxides, the alkylene oxides may be reacted as a complete mixture providing a random distribution of oxyalkylene units within the alkylene oxide chain of the polyol or alternatively they may be reacted in a stepwise manner so as to provide a block distribution within the oxyalkylene chain of the polyol.

The polyols useful in the isocyanate-reactive composition of the present invention include polyether polyols and polyester polyols. Most preferred for preparing rigid foams are those having from about 2 to about 8 active hydrogen atoms and having a hydroxyl number from about 50 to about 800, preferably from about 100 to about 650, and most preferably from about 200 to about 550. Examples of such polyols include those commercially available under the product name Multranol from Bayer Polymers LLC.

Other components useful in producing the polyurethanes of the present invention include surfactants, pigments, colorants, fillers, antioxidants, flame retardants, stabilizers, and the like.

When preparing polyisocyanate-based foams, it is generally advantageous to employ a minor amount of a surfactant to stabilize the foaming reaction mixture until it obtains rigidity. Such surfactants advantageously comprise a liquid or solid organosilicon compound. Other, less preferred surfactants include polyethylene glycol ethers of long chain alcohols, tertiary amine or alkanolamine salts of long chain alkyl acid sulfate esters, alkylsulfonic esters, alkylarylsulfonic acids and non-ionic surfactants. Such surfactants are employed in amounts sufficient to stabilize the foaming reaction mixture against collapse and the formation of large, and uneven cells. Typically, about 0.2 to about 5.0 parts of the surfactant per 100 parts per weight isocyanate reactive composition are sufficient for this purpose.

The components described may be employed to produce rigid polyurethane and polyurethane-modified isocyanurate foam. The rigid foams of the present invention may be made in a one-step process by reacting all of the ingredients together at once, or foams can be made by the so-called "quasi prepolymer" method. In the one-shot process where foaming is carried out using machines, the active hydrogen containing compounds, catalyst, surfactants, blowing agents and optional additives may be introduced separately to the mixing head where they are combined with the polyisocyanate to give the polyurethane-forming mixture. The mixture may be poured or injected into a suitable container, mold, or non-molded product as required. For use of machines with a limited number of component lines into the mixing head, a premix of all the components except the polyisocyanate can be advantageously employed. This simplifies the metering and mixing of the reacting components at the time the polyurethane-forming mixture is prepared.

Alternatively, the foams may be prepared by the so-called "quasi-prepolymer" method. In this method, a portion of the polyol component is reacted in the absence of catalyst with the polyisocyanate component in an amount such that from about 10 percent to about 30 percent free isocyanate groups are present in the reaction product based on the prepolymer. To prepare foam, the remaining portion of the polyol is added and the components are allowed to react together in the presence of a catalyst composition and other appropriate additives such as blowing agent, surfactant, etc. Other additives may be added to either to the isocyanate prepolymer or to the remaining polyol or to both prior to the mixing of the components. At the end of the reaction, a rigid polyurethane foam is obtained.

Foam-forming mixtures which include the catalyst composition of the present invention remain flowable for a period which is at least long enough to fill the mold or cavity in which foaming is to take place, generally for periods of up to 600 seconds, preferably for a period of from about 25 to about 180 seconds.

The pressure generated by foam-forming mixtures catalyzed in accordance with the present invention is substantially lower than that generated by currently used systems due to the promotion of the foaming reaction sufficiently early in the foam-forming process that the carbon dioxide and physical blowing agent based gases may be generated before the foam begins to gel to any significant extent. Typically the pressure generated will be less than 200 hPa, preferably less than 140 hPa, most preferably less than 120 hPa as measured in a cylindrical, vertical flow tube approximately 59 inches tall by 4 inches wide, with a pressure indicator approximately 7" above the base.

The foams of the present invention are characterized by uniform cell size and good insulation properties.

The polyurethane foams produced in accordance with the present invention are useful in a wide range of molded and non-molded product applications such as insulation for water heaters.

The following Examples are given as being illustrative of the present invention. All parts and percentages given in these Examples are parts by weight and percentages by weight, unless otherwise indicated.

EXAMPLES

The following materials were used in the Examples which follow:

Polyol A: An aromatic amine-initiated polyether polyol having an OH number of about 395 and a functionality of 4 which is commercially available from Bayer Polymers LLC under the name Multranol 9166.

Polyol B: A sucrose-initiated polyether polyol having an OH number of approximately 380 and a functionality of 5.8 which is commercially available from Bayer Polymers LLC under the name Multranol 4030.

Polyol C: An aromatic polyester polyol having a functionality of 2 and an OH number of about 240 which is commercially available from Stepan Company under the name Stepanpol 2502A Polyol D: A sucrose-initiated polyether polyol having an OH number of about 470 and a functionality of 5.2, which is commercially available from Bayer Polymers LLC under the name Multranol 4034.

Polyol E: An aromatic amine-initiated polyether polyol having an OH number of about 360 and a functionality of 4 which is commercially available from Bayer Polymers LLC under the name Multranol 8120.

Polyol F: A glycerine-based propoxylated triol having an OH number of about 470 and a functionality of about 3 which is commercially available from Bayer Polymers LLC under the name Multranol E-9158.

Polyol G: A sucrose-initiated polyether polyol having an OH number of about 470 and a functionality of 5.5, which is commercially available from Bayer Polymers LLC under the name Multranol 9196.

ISO: A polymeric MDI having an NCO content of 31.5% which is commercially available from Bayer Polymers LLC under the name Mondur MR.

HFC-245fa: 1,1,1,3,3-pentafluoropropane.

HCFC-141b: 1,1-dichloro-1-fluoroethane.

CP: Exxsol HP-95 cyclopentane which is commercially available from ExxonMobil.

Surfactant A: The surfactant commercially available from Degussa Goldschmidt under the designation B-8404.

Surfactant B: The surfactant which is commercially available from Degussa Goldschmidt under the designation B-8465.

PMDETA: Pentamethyldiethylenetriamine; commercially available under the name Polycat 5 from Air Products.

BDMAEE: Bis(2-dimethylaminoethyl)ether; commercially available under the names BL-11 (Air Products) and Niax A1 (OSi Specialties).

DMCHA: N,N-dimethylcyclohexylamine; commercially available under the name Polycat 8 (Air Products).

PV: Pentamethyldiethylenetriamine: A tertiary amine catalyst commercially available from Rhein Chemie Corporation under the name Desmorapid PV.

The following procedure was used to produce each of the foams described in these Examples.

Each of the polyols, catalysts, and materials listed in a given Example with the exception of the ISO were combined in the indicated amounts (given in parts by weight) to form an isocyanate-reactive composition. This isocyanate-reactive composition was then combined with the ISO, stirred and introduced into an aluminum mold maintained at a temperature of 40° C. where foaming was completed. Each of the foams was then tested. The results of these tests are reported in the Tables given below.

Examples 1–2

As is evident from the data presented below in TABLE 1, the foam produced in accordance with the present invention generated a significantly lower amount of pressure than the foam produced using a typical catalyst combination of a blowing catalyst and gel catalyst. This generation of less pressure did not, however, adversely affect the physical properties of the foam.

TABLE 1

| EXAMPLE | 1 | 2 (Comparative) |
|---|---|---|
| Polyol A (pbw) | 38.36 | 38.36 |
| Polyol G (pbw) | 19.14 | 19.14 |
| Polyol C (pbw) | 24.64 | 24.64 |
| Surfactant A (pbw) | 1.90 | 1.88 |
| DMCHA (pbw) | 0.00 | 0.35 |
| PV (pbw) | 0.00 | 0.35 |
| BDMAEE (pbw) | 0.34 | 0.00 |
| PMDETA (pbw) | 0.34 | 0.00 |
| Water (pbw) | 2.77 | 2.77 |
| HFC-245fa (pbw) | 12.51 | 12.51 |
| ISO (pbw) | 129.64 | 129.64 |
| Reactivity-Chemical temp. 15° C. | | |
| Mix (sec) | 5 | 7 |
| Cream (sec) | 7 | 10 |
| Gel (sec) | 80.5 | 77 |
| Density (pcf) | 1.77 | 1.76 |
| Fluidyne Data: Tube temp. 40° C. Chem. temps. 15° C. Ambient pressure (mm Hg): 737 | | |
| Gel (sec) | 80 | 82 |
| adjusted end height (cm) | 107.6 | 101.7 |
| Max. foam pressure (hPa) | 114 | 181 |

Examples 3–4

As can be seen from the data presented below in Table 2, the foam produced in accordance with the present invention generated significantly less pressure than the foam produced with the typical catalyst combination of a blowing catalyst and a gel catalyst. This lower pressure was achieved without sacrificing the other physical properties of the foam.

TABLE 2

| EXAMPLE | 3 | 4 (Comparative) |
|---|---|---|
| Polyol D (pbw) | 34.09 | 33.97 |
| Polyol E (pbw) | 34.09 | 33.97 |
| Polyol F (pbw) | 8.525 | 8.49 |
| Polyol C (pbw) | 8.525 | 8.49 |
| Surfactant C (pbw) | 1.28 | 1.28 |
| DMCHA (pbw) | 0.00 | 0.95 |
| BDMAEE (pbw) | 0.42 | 0.00 |
| PMDETA (pbw) | 0.42 | 0.2 |
| Water (pbw) | 1.72 | 1.72 |
| CP (pbw) | 10.93 | 10.93 |
| ISO (pbw) | 117.95 | 117.64 |
| Reactivity-Chemical temp. 25° C. | | |
| Mix (sec) | 4 | 5 |
| Cream (sec) | 7 | 10 |
| Gel (sec) | 80.5 | 77 |
| Density (pcf) | 1.87 | 1.89 |
| Fluidyne Data: Tube temp. 40° C. Chem. temps. 25° C. Ambient pressure (mm Hg): 737 | | |
| Gel (sec) | 79 | 72 |
| adjusted end height (cm) | 96.4 | 94.9 |
| Max. foam pressure (hPa) | 110 | 182 |

Examples 5–6

The foam produced in accordance with the present invention generated less pressure than the foam produced with the combination of a blowing catalyst and gel catalyst used in the prior art. As can be seen from the data presented below in Table 3, the foam produced in accordance with the present invention had good physical properties.

TABLE 3

| EXAMPLE | 5 | 6 (Comparative) |
|---|---|---|
| Polyol A (pbw) | 55.52 | 55.52 |
| Polyol B (pbw) | 15.86 | 15.86 |
| Polyol C (pbw) | 7.93 | 7.93 |
| Surfactant A (pbw) | 1.65 | 1.65 |
| DMCHA (pbw) | 0.00 | 0.22 |
| PMDETA (pbw) | 0.22 | 0.22 |
| BDMAEE (pbw) | 0.22 | 0.00 |
| Water (pbw) | 1.73 | 1.73 |
| HCFC-141b (pbw) | 16.87 | 16.87 |
| ISO (pbw) | 101.61 | 101.61 |
| Reactivity-Chemical temp. 25° C./Demold at 20 minutes | | |
| Minimum fill density (pcf) | 1.78 | 1.83 |
| Molded Density (pcf) | 1.93 | 2.03 |
| % Overpack | 7.97 | 11.22 |
| Dimensional Stability | | |
| 1° C. 1 day | −0.1 | 0.2 |
| 1° C. 3 day | −0.6 | −0.1 |
| % Closed Cells | 86.9 | 87.5 |
| Core Density (pcf) | 1.67 | 1.75 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a rigid dimensionally stable polyurethane foam comprising reacting a) an organic isocyanate with b) an isocyanate-reactive compound in the presence of c) a blowing agent comprising water and d) a catalyst composition comprising at least two different blowing catalysts in which the catalyst composition comprises pentamethyldiethylene triamine and bis(2-dimethylaminoethyl)ether.

2. The process of claim 1 in which the catalyst composition includes from about 0.02 to about 1.0 parts by weight of each of the blowing catalysts.

3. The process of claim 1 in which the catalyst composition comprises from about 0.2 to about 0.3 parts by weight of each blowing catalyst.

4. The process of claim 1 in which b) comprises an amine-initiated polyol.

5. The process of claim 4 in which b) further comprises a second polyether or a polyester polyol.

6. The process of claim 1 in which blowing agent mixture c) further comprises a hydrocarbon, an HCFC, an HFC or a combination thereof.

7. The process of claim 1 in which up to 7% by weight, based on the total weight of b)+c)+d), of water is included in blowing agent c).

8. The process of claim 1 in which the amine-initiated polyol is an o-toluenediamine-initiated polyether polyol.

9. The process of claim 1 in which the isocyanate reactive compound is a polyether polyol and a polyester polyol.

10. A process for the production of a rigid, dimensionally stable polyurethane foam comprising reacting a) an organic isocyanate with b) an isocyanate-reactive composition comprising an amine-initiated polyol and a second isocyanate-reactive compound in the presence of c) a blowing agent comprising water and d) a catalyst composition comprising pentamethyldiethylene triamine and bis(2-dimethylaminoethyl) ether.

11. A rigid polyurethane foam produced by the process of claim 1.

12. A rigid polyurethane foam produced by the process of claim 10.

13. A water heater insulated with the foam of claim 11.

14. A water heater insulated with the foam of claim 12.

* * * * *